(12) United States Patent
Chang et al.

(10) Patent No.: US 9,978,341 B2
(45) Date of Patent: May 22, 2018

(54) VISUAL DATA PROCESSING METHOD AND VISUAL DATA PROCESSING SYSTEM WHICH CAN PERFORM A PROCESS OPERATION ACCORDING TO A GAZING POINT

(71) Applicant: MEDIATEK INC., Hsin-Chu (TW)

(72) Inventors: Tsui-Shan Chang, Tainan (TW); Tsu-Ming Liu, Hsinchu (TW)

(73) Assignee: MEDIATEK INC., Hsin-chu (TW)

( * ) Notice: Subject to any disclaimer, the term of this patent is extended or adjusted under 35 U.S.C. 154(b) by 0 days. days.

(21) Appl. No.: 14/973,641

(22) Filed: Dec. 17, 2015

(65) Prior Publication Data

US 2016/0179196 A1    Jun. 23, 2016

Related U.S. Application Data

(60) Provisional application No. 62/095,889, filed on Dec. 23, 2014.

(51) Int. Cl.
| | |
|---|---|
| *G09G 5/30* | (2006.01) |
| *G06F 3/03* | (2006.01) |
| *G06T 9/00* | (2006.01) |
| *G06F 3/01* | (2006.01) |
| *G06T 5/00* | (2006.01) |
| *G09G 5/02* | (2006.01) |
| *G06F 1/16* | (2006.01) |

(52) U.S. Cl.
CPC .............. *G09G 5/30* (2013.01); *G06F 1/1684* (2013.01); *G06F 3/013* (2013.01); *G06F 3/017* (2013.01); *G06F 3/0304* (2013.01); *G06T 5/003* (2013.01); *G06T 9/00* (2013.01); *G09G 5/02* (2013.01); *G06T 2210/36* (2013.01); *G09G 2320/0626* (2013.01); *G09G 2340/02* (2013.01)

(58) Field of Classification Search
CPC ...... G06F 3/013; G06F 3/0304; G06F 1/1684; G06F 3/017; G09G 2320/0626; G09G 5/30; G09G 5/02; G09G 2340/02; G06T 2210/36; G06T 5/003; G06T 9/00
See application file for complete search history.

(56) References Cited

U.S. PATENT DOCUMENTS

| | | | | |
|---|---|---|---|---|
| 6,078,349 | A * | 6/2000 | Molloy ................. | G06F 3/0481 348/14.07 |
| 6,239,834 | B1 * | 5/2001 | Miyaji ................. | H04N 17/004 348/180 |
| 9,591,599 | B2 * | 3/2017 | Chen .................... | H04W 56/004 |
| 2006/0222246 | A1 * | 10/2006 | Murai ................... | G06F 3/1462 382/232 |
| 2011/0206283 | A1 * | 8/2011 | Quarfordt ............ | G06K 9/0061 382/220 |
| 2014/0003658 | A1 * | 1/2014 | Hein .................... | G06K 9/00335 382/103 |

(Continued)

*Primary Examiner* — Mark K Zimmerman
*Assistant Examiner* — Phuc N Doan
(74) *Attorney, Agent, or Firm* — Oblon, McClelland, Maier & Neustadt, L.L.P.

(57) ABSTRACT

A visual data processing method applied to a visual data processing system. The visual data processing method comprises: (a) detecting a gazing point position of a user on a display; and (b) performing at least one process operation to visual data according to at least one distance between at least one display location for the visual data on the display and the gazing point position.

14 Claims, 14 Drawing Sheets

(56) References Cited

U.S. PATENT DOCUMENTS

| | | | | |
|---|---|---|---|---|
| 2014/0361977 A1* | 12/2014 | Stafford | ............ | G02B 27/0093 |
| | | | | 345/156 |
| 2015/0131850 A1* | 5/2015 | Qvarfordt | .......... | G06K 9/00617 |
| | | | | 382/103 |
| 2015/0215599 A1* | 7/2015 | D'Amato | .......... | H04N 13/0048 |
| | | | | 348/42 |
| 2015/0279318 A1* | 10/2015 | Lee | .......................... | G06T 1/60 |
| | | | | 345/690 |
| 2015/0287158 A1* | 10/2015 | Cerny | ..................... | G06F 3/013 |
| | | | | 345/553 |
| 2016/0098963 A1* | 4/2016 | Kim | ..................... | G09G 3/3426 |
| | | | | 345/690 |
| 2016/0179196 A1* | 6/2016 | Chang | ..................... | G06F 3/013 |
| | | | | 345/589 |
| 2016/0210765 A1* | 7/2016 | Nishimura | ............ | G06T 11/206 |

\* cited by examiner

| Compression algorithm | Complexity | Power consumption | Compression level | Image quality |
|---|---|---|---|---|
| Algorithm #1 | 5 (highest) | 5 (highest) | 1/8 or $QP_0+2$ | 1 (lowest) |
| Algorithm #2 | 4 | 4 | 1/4 or $QP_0+1$ | 2 |
| Algorithm #3 | 3 | 3 | 1/4 or $QP_0$ | 3 |
| Algorithm #4 | 2 | 2 | 1/2 or $QP_0+1$ | 4 |
| Algorithm #5 | 1 (lowest) | 1 (lowest) | 1/2 or $QP_0+2$ | 5 (highest) |

FIG. 3

| Area type | Applied compression algorithm | Visual quality |
|---|---|---|
| Processing area #1 | Algo. #5 | 5 (highest) |
| Processing area #2 | Algo. #4 | 4 |
| Processing area #3 | Algo. #3 | 3 |
| Processing area #4 | Algo. #2 | 2 |
| Processing area #5 | Algo. #1 | 1 (lowest) |

VISUAL DATA PROCESSING METHOD AND VISUAL DATA PROCESSING SYSTEM WHICH CAN PERFORM A PROCESS OPERATION ACCORDING TO A GAZING POINT

CROSS REFERENCE TO RELATED APPLICATIONS

This application claims the benefit of U.S. Provisional Application No. 62/095,889, filed on 2014 Dec. 23, the contents of which are incorporated herein by reference.

BACKGROUND

Visual data, which means data can be displayed and seen by a user (ex. image data or video data), always needs to be further processed to meet different requirements.

For examples, the visual data may need to be compressed to save transmission bandwidth or storage space. The decompressed visual data corresponding to different compression algorithms have different qualities. For more detail, in one example, if decompressed visual data with high quality is desired, the compression algorithm should comprise few steps, less compressing time, or the decompressed visual data may have distortion. On the contrary, if a compression algorithm with complicated steps, and long compressing time is applied, the corresponding decompressed visual data may have poor quality since more distortion for decompressed visual data may exist. Also, compression ratios for different compression algorithms are also different. Therefore, it is hard to select a proper compression algorithm for visual data since the visual data is always compressed via a single compression algorithm.

SUMMARY

Therefore, one objective of the present application is to provide a visual data processing method which can process visual data according to a vision of a user.

Another objective of the present application is to provide a visual data processing system which can process visual data according to a vision of a user.

One embodiment of the present application discloses a visual data processing method applied to a visual data processing system. The visual data processing method comprises: (a) detecting a gazing point position of a user on a display; and (b) performing at least one process operation to visual data according to at least one distance between at least one display location for the visual data on the display and the gazing point position.

Another embodiment of the present application discloses a visual data processing system comprising: an eye tracking device, configured to detect a gazing point position of a user on a display; and a processing device, configured to perform at least one process operation to visual data according to at least one distance between at least one display location for the visual data on the display and the gazing point position.

In view of above-mentioned embodiments, the visual data can be processed according to the gazing point position of a user, thus the user can have better experience while watching the visual data. Also, the visual data processing method and the visual data processing system provided by the present application can be applied to various kinds of electronic devices, which can cause more convenience for the user.

These and other objectives of the present application will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a schematic diagram illustrating different compression algorithms.

DETAILED DESCRIPTION

Following embodiments are provided for explaining the concept of the present application. Please note the following embodiments are only for example and do not mean to limit the scope of the present application.

Figure 1:
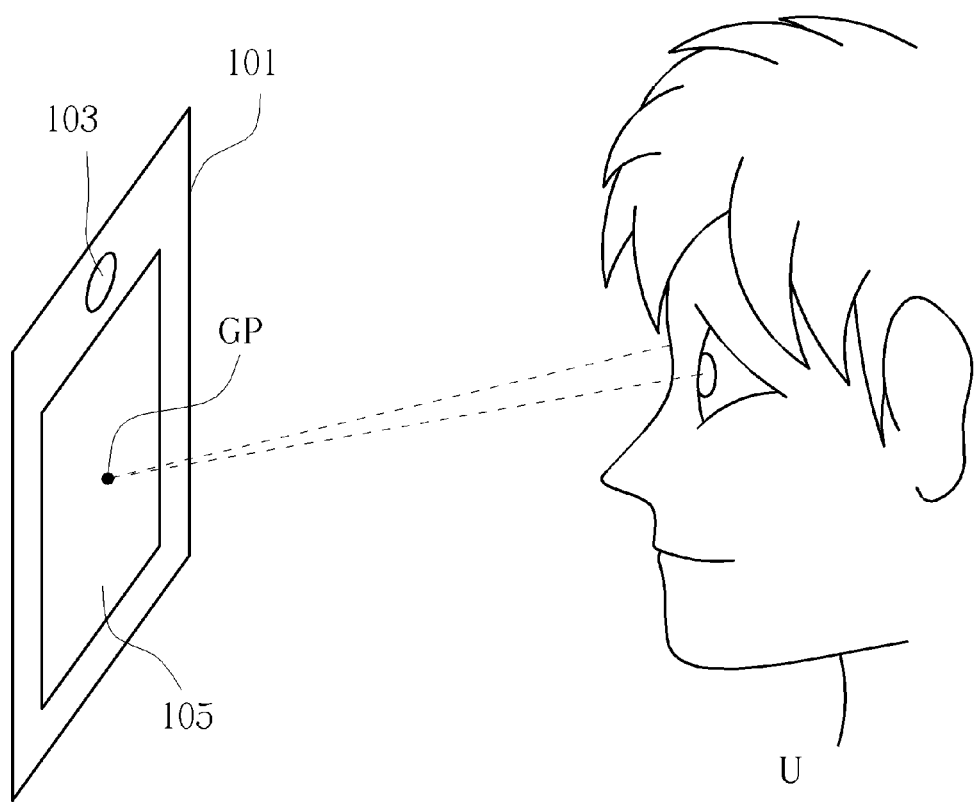
FIG. 1 is a schematic diagram illustrating a visual data processing method according to one embodiment of the present application.

FIG. 1 is a schematic diagram illustrating a visual data processing method according to one embodiment of the present application. As illustrated in FIG. 1, the portable electronic device 101 (ex. a mobile phone) comprises a camera 103 and a display 105. The camera 103 serves as an eye tracking device. However, the eye tracking device can be implemented by other devices. If a user U gazes at the display 105, the gazing point position GP of the user U can be detected by the camera 103. After that, at least one process operation is performed to visual data according to at least one distance between at least one display location for the visual data on the display 105 and the gazing point position GP. Please note, in one embodiment the gazing point position is a position which is detected before the visual data being displayed for a predetermined time interval. However, the gazing point position can be real time gazing point position as well.

The visual data can be, for example, image data or video data, but not limited. More detail steps for the visual data processing method will be described later. Please note, in following embodiments, compression is taken for an example of the process operation for explaining. However, the process operation can be any other operation.

Figure 2:
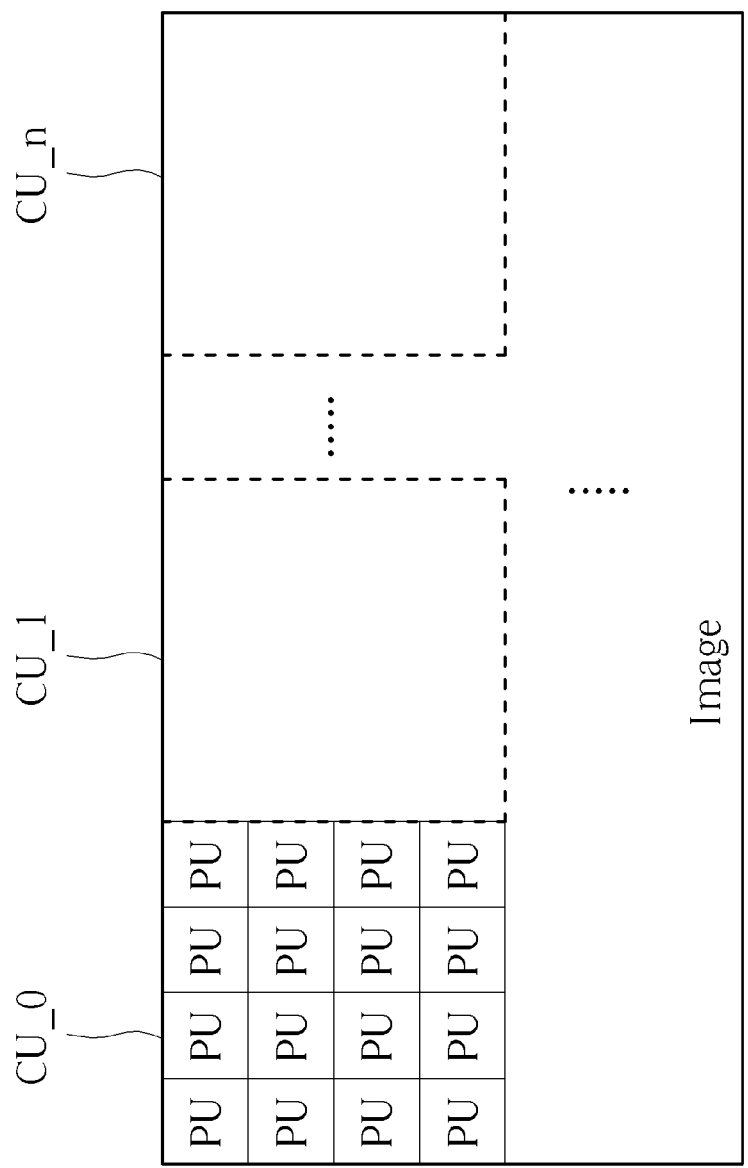
FIG. 2 is a schematic diagram illustrating the examples of units for compression.

FIG. 2 is a schematic diagram illustrating the examples of basic units for compression. As illustrated in FIG. 2, the image comprises a plurality of compression units CU_1, CU_2 . . . CU_n, which is a basic unit for compression and respectively comprises a plurality of sub-compression units PU. In one embodiment, each of the compression units CU_1, CU_2 . . . CU_n comprises 64×64 pixels and the sub-compression unit PU comprises 16×16 pixels.

FIG. 3 is a schematic diagram illustrating different compression algorithms. As illustrated in FIG. 3, the compression algorithms #1, #2, #3, #4 and #5 respectively comprises different complexities, different power consumption, different compression levels and/or different image qualities. For example, the compression algorithm #1 has a highest complexity, and highest power consumption. Also, de-compressed visual data corresponding to the compression algorithm #1 has a lowest image quality. However, the compression algorithm #1 has a highest compression level, which means, for example, the visual data is compressed to have only ⅛ data size of the original data or the quantization parameter Qp has a highest QP0+2. The QP0 indicates a basic quantization parameter. On the contrary, the compression algorithm #5 has a highest complexity, and a lowest power consumption. Also, de-compressed visual data corresponding to the compression algorithm #5 has a highest image quality. However, the compression algorithm #5 has a low compression level. Accordingly, neither the compression algorithm #1 nor the compression algorithm #5 is proper for compressing a full image.

In one embodiment, the visual data processing method provided by the present application further comprises: classifying the visual data into a plurality of processing areas according to the distances between the display locations for the visual data and the gazing point position; and performing the same processing operation with different parameters or performing different operations to the visual data displayed on different one of the processing areas. The visual data can be classified by column, by row or by pixel area with any shape (i.e. with a predetermined shape).

Figure 4:
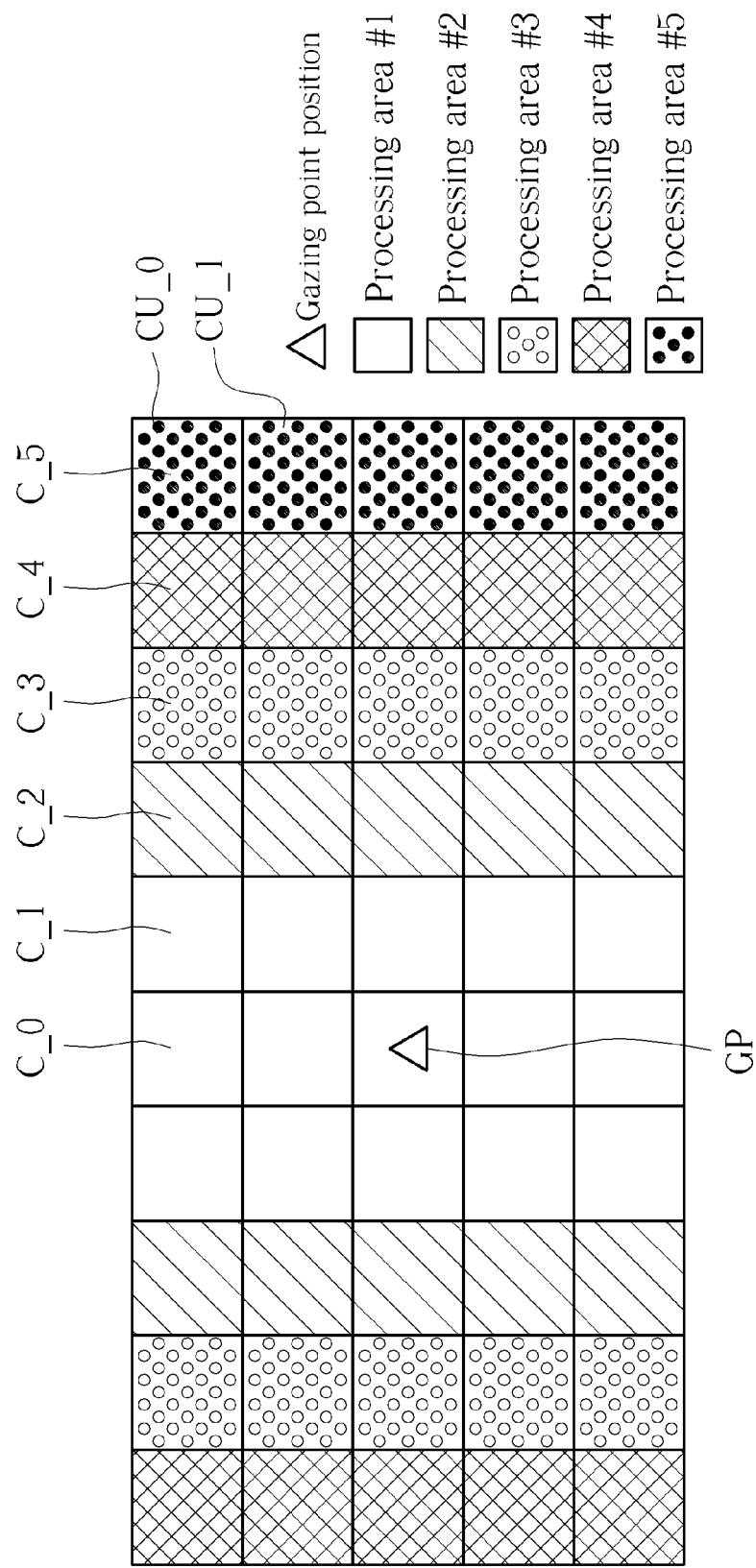
FIG. 4 is a schematic diagram illustrating an example for classifying processing areas according to one embodiment of the present application.

FIG. 4 is a schematic diagram illustrating an example for classifying processing areas according to one embodiment of the present application. In this embodiment, the visual data is classified by column. For more detail, the visual data is classified into columns C_0-C_5 (only part of them are marked) comprising a plurality of compression units CU_0, CU_1 (only part of them are marked). Also, as illustrated in FIG. 4, the columns C_0-C_5 are classified into processing areas #1, #2, #3, #4 and #5 depending on the distances between each column and the gazing point position GP. For example, the columns C_0 and C_1 are close to the gazing point position GP, thus are classified into the processing area #1. On the contrary, the column C_5 is far from the gazing point position GP, thus is classified into the processing area #5.

Figures 5, 6:
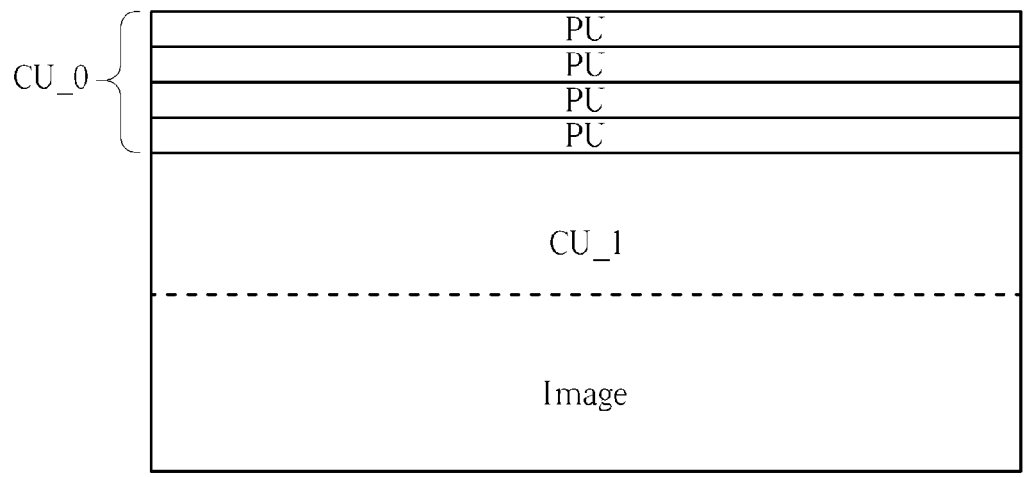
FIG. 5 is a schematic diagram illustrating different compression algorithms are applied to different processing areas according to one embodiment of the present application.
FIG. 6, FIG. 7 are schematic diagram illustrating examples for classifying processing areas according to another embodiment of the present application.

After the visual data is classified, different compression algorithms are performed to different processing areas. FIG. 5 is a schematic diagram illustrating different compression algorithms are applied to different processing areas according to one embodiment of the present application. As illustrated in FIG. 5, the compression algorithms #5, #4, #3, #2 and #1 are respectively performed to the visual data to be displayed on processing areas #1, #2, #3, #4 and #5. As above-mentioned, different compression algorithms have different characteristics. Accordingly, the visual data which will be displayed on different processing areas will have different characteristics. For example, the compression algorithm #5 in FIG. 3 is applied to the processing area #1. Accordingly, the visual data corresponding to the processing area #1 has a highest quality (ex. image quality or video quality).

Figure 7:
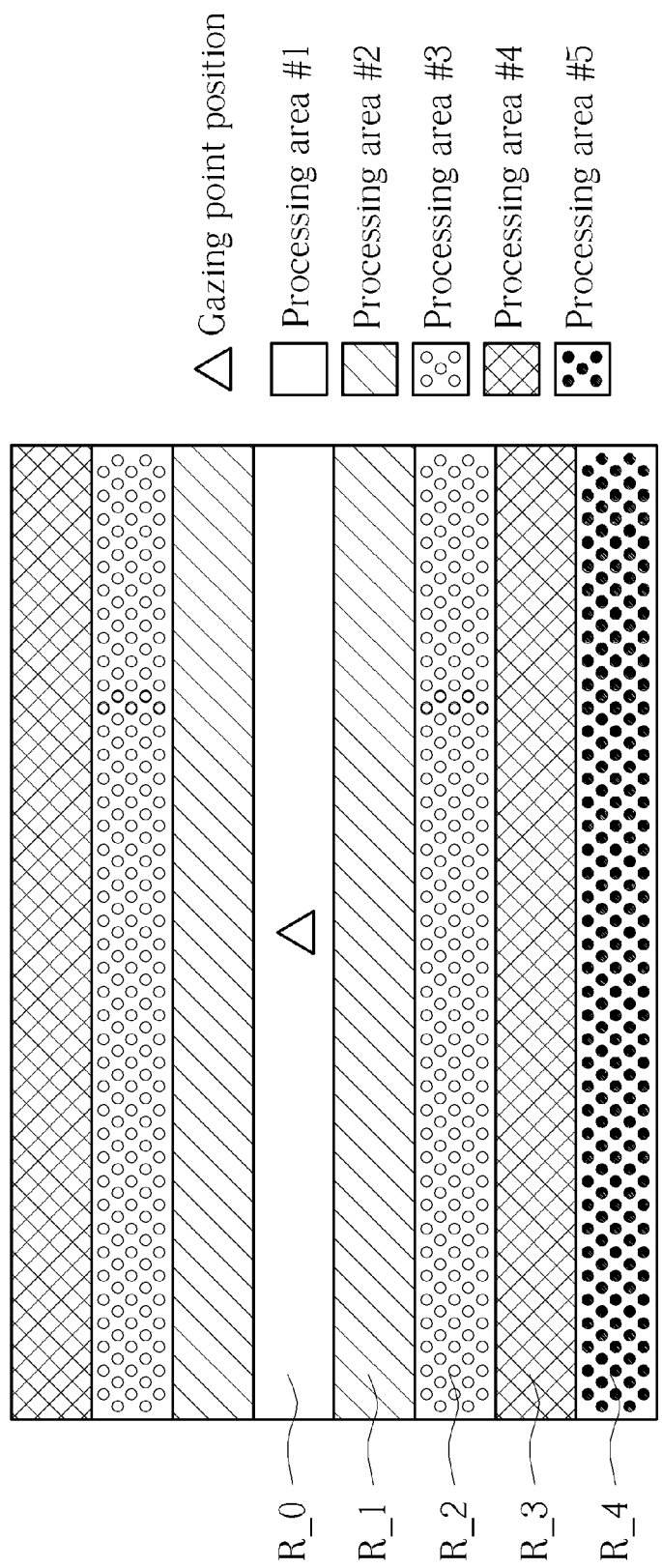

The embodiments in FIG. 4 and FIG. 5 are only examples and do not mean to limit the scope of the present application. The visual data can be classified into other arrangements of processing areas. FIG. 6, FIG. 7 are schematic diagram illustrating examples for classifying processing areas according to another embodiment of the present application. As illustrated in FIG. 6, lengths of the compression units CU_0, CU_1 (only some of them are illustrated) and lengths of the sub-compression unit PU are equal to a length for the row of visual data (an image in this example). Also, each of the compression units CU_0, CU_1 comprises four sub-compression units PU in this embodiment.

In the embodiment of FIG. 7, the visual data is classified by row. For more detail, the visual data is classified into rows R_0-R_4 (only part of them are marked). Also, as illustrated in FIG. 7, the rows R_0-R_4 are classified into processing areas #1, #2, #3, #4 and #5 depending on the distances between each row and the gazing point position GP. For example, the row R_0 is close to the gazing point position GP, thus is classified into the processing area #1. On the contrary, the row R_4 is far from the gazing point position GP, thus is classified into the processing area #5.

After the visual data is classified, different compression algorithms are performed to visual data to be displayed on different processing areas, as illustrated in FIG. 5. Related descriptions have been depicted above, thus are omitted for brevity here.

Figure 8:
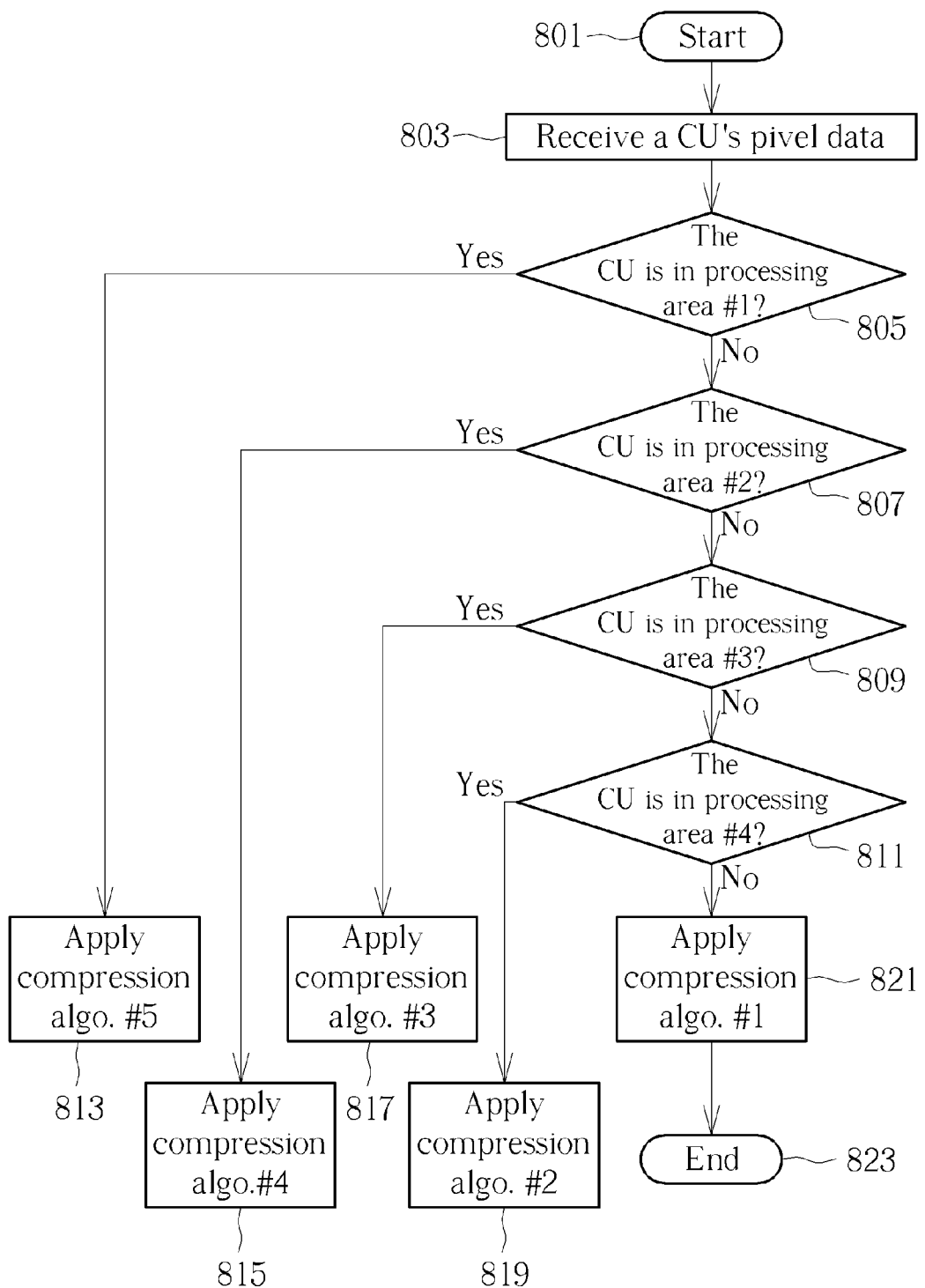
FIG. 8 is a flow chart illustrating a flow chart for a visual data processing method according to one embodiment of the present application.

FIG. 8 is a flow chart illustrating a flow chart for a visual data processing method according to one embodiment of the present application. In FIG. 8, the step 803 comprises: receive CU's visual data, which means receive visual data to be displayed. Also, in FIG. 8, steps 805-811 indicate applying different compression algorithms to CUs corresponding to different processing areas. For example, if one CU is received, it is check if this CU is in the processing area #1 (step 805), if yes, the compressions algorithm #5 is performed to the CU (step 813), if not, check if this CU is in the processing area #2 (step 807). Other steps follow the same rule, thus are omitted for brevity here. It will be appreciated that FIG. 8 is only an example and do not mean to limit the steps for the visual data processing method of the present application.

The part of visual data which a user gazes at is always an important part and a part that the user is interested in. Accordingly, in view of above-mentioned embodiments, the visual data near the gazing point position can have better quality after compressed and de-compressed. Accordingly, the user may have better experience while watching the visual data.

Additionally, as above-mentioned, the processing operation is not limited to a compression operation. In one embodiment, the process operation comprises at least one of: a sharpening operation, a brightness adjusting operation, a color adjusting operation, and a blur level adjusting operation. The sharpening operation can be applied to adjust the sharpness of the visual data. The brightness adjusting operation can be applied to adjust the brightness of the visual data. The color adjusting operation and the blur level adjusting operation are applied to respectively adjust the color and the blur level of the visual data. The above-mentioned visual processing method can be further applied to other applications. For example, the user can use his vision to control which part of the visual data should be adjusted. In one embodiment, the process operation is performed to the visual data based on the gazing point position, thereby the quality (ex. image quality or video quality) of the visual data is inversely correlated with (for example, inversely proportional to) the distance between display locations and the gazing point position.

Figure 9:
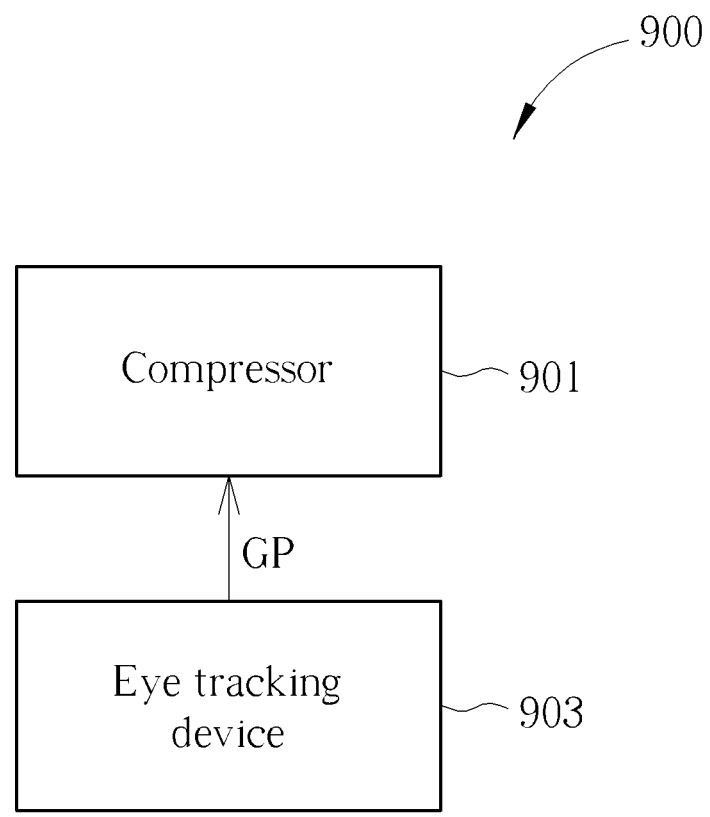
FIG. 9 is a block diagram illustrating a visual processing system according to one embodiment of the present application.

FIG. 9 is a block diagram illustrating a visual processing system according to one embodiment of the present application. As illustrated in FIG. 9, the visual data processing system 900 comprises a compressor 901 and an eye tracking device 903. The eye tracking device 903 such as a camera is applied to detect a gazing point position of a user. After that, the compressor 901 performs a compression operation according to the gazing point position, as illustrated in above-mentioned embodiments. Further, as above-mentioned, the compression operation can be replaced with other operations such as: a sharpening operation, a brightness adjusting operation, a color adjusting operation, or a blur level adjusting operation. In such cases, the compressor 901 is replaced by corresponding processing devices such as a sharpening device, a brightness adjusting device, a color adjusting device, or a blur level adjusting device.

Figure 10:
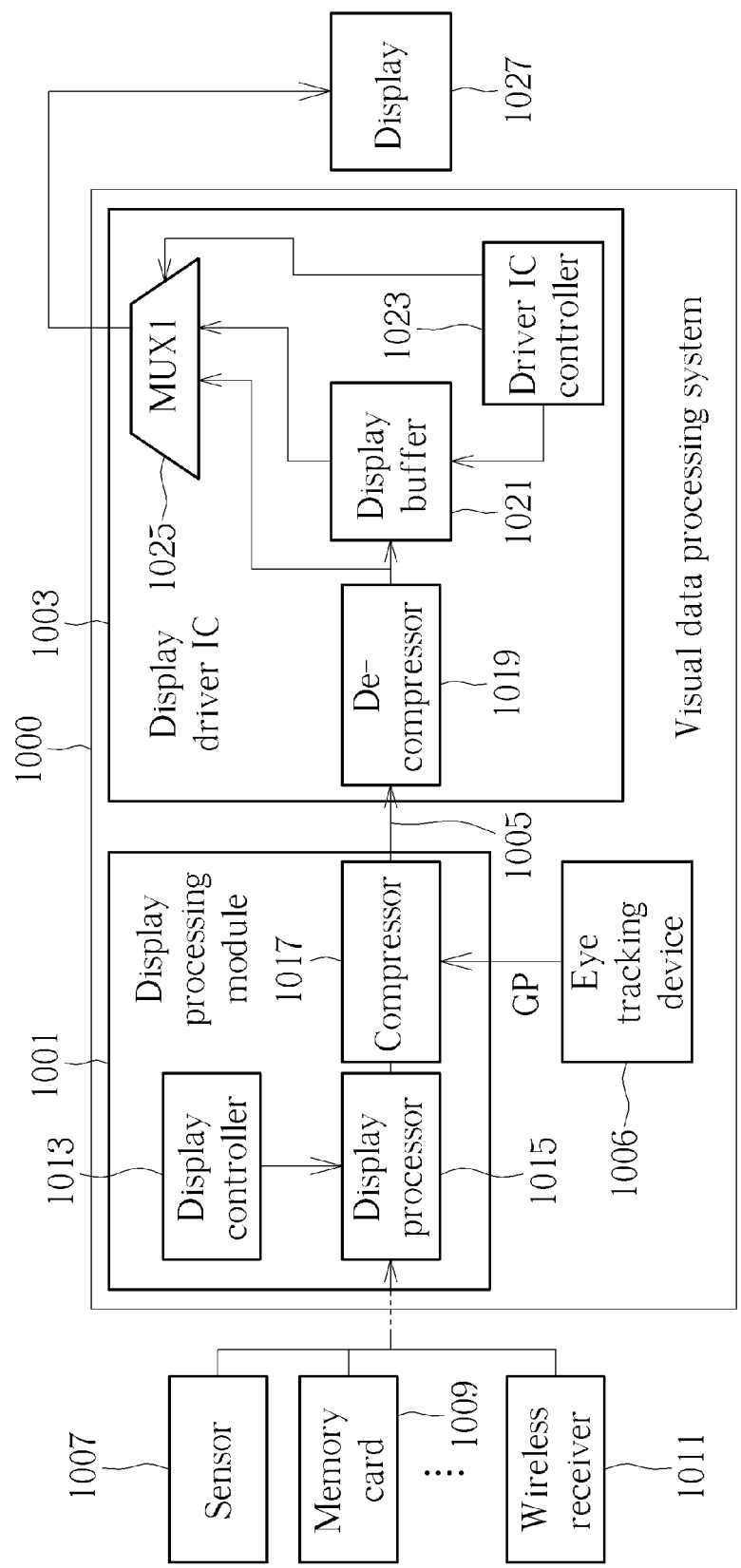
FIG. 10, FIG. 11 are block diagrams illustrating examples for detail structures of the visual processing system illustrated in FIG. 9.
Figure 11:
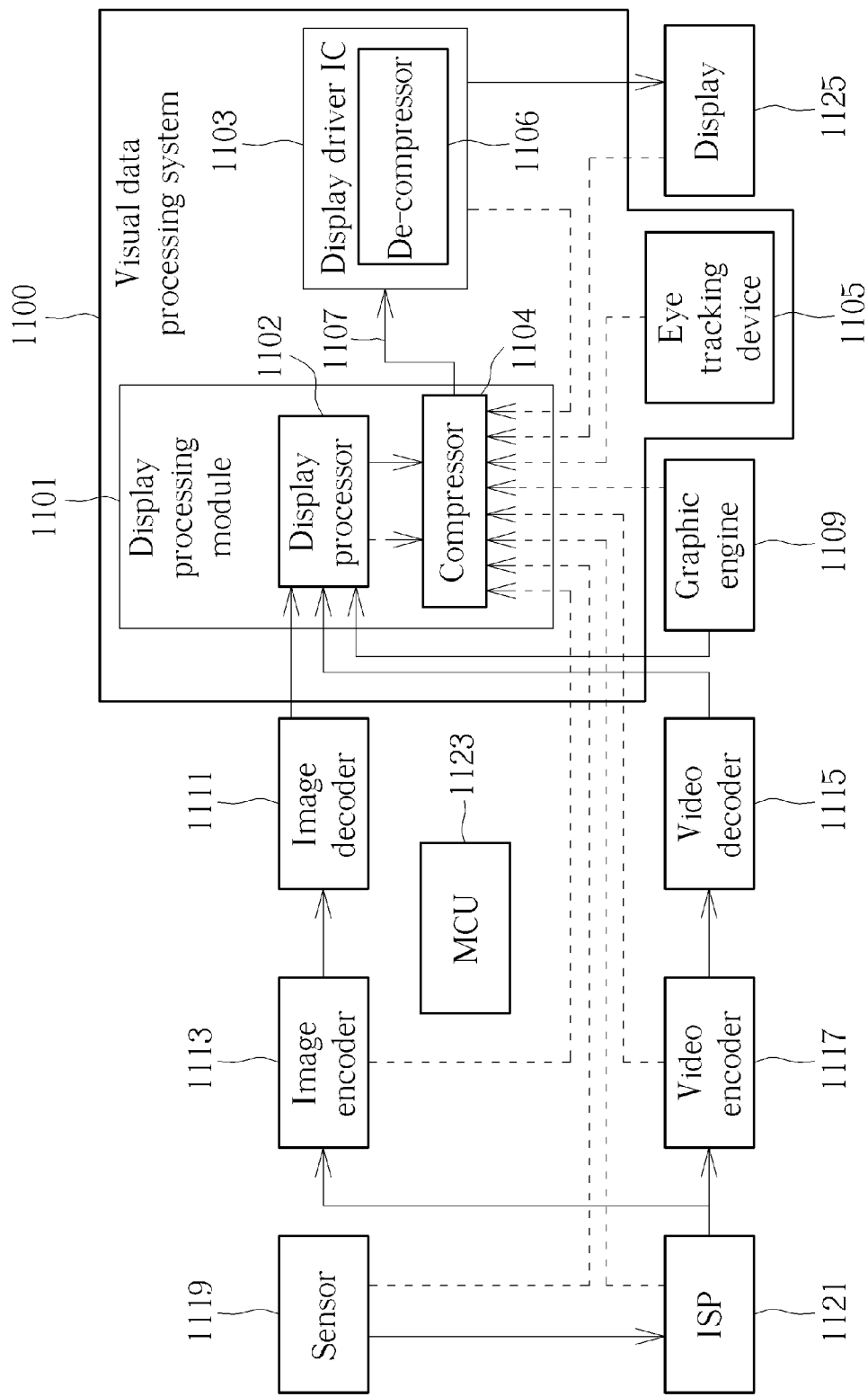

FIG. 10, FIG. 11 are block diagrams illustrating examples for detail structures of the visual processing system illustrated in FIG. 9. In the embodiments of FIG. 10 and FIG. 11, the visual data is compressed by the compressing operation and then de-compressed for display. As illustrated in FIG. 10, the visual data processing system 1000 comprises a display processing module 1001, a display driver IC (integrated circuit) 1003 and an eye tracking device 1006. The display processing module 1001 is applied to receive original visual data from various kinds of sources such as a sensor 1007, a memory card 1009 or a wireless receiver 1011. After that, the display processing module 1001 processes the visual data to be visual data which can be displayed, and transmits the visual data which can be displayed to the display driver IC 1003 via the display interface 1005. Then, the visual data is transmitted to the display 1027 and displayed.

The compressor 1017 is provided in the display processing module 1001, and a corresponding de-compressor 1019 is provided in the display driver IC 1003. The visual data is compressed by the compressor 1017 according to the gazing point position GP before transmitted to the display driver IC 1003. Then the de-compressor 1019 decompresses the compressed visual data. By this way, required bandwidth and a number of transmitting lines of the display interface 1005 can be reduced. In one embodiment, the display interface 1005 follows the DSI (Display Serial Interface) specification, and the compressor 1017 applies a frame buffer compression algorithm.

In one embodiment, the display processing module 1001 comprises a display controller 1013 and a display processor 1015 besides the compressor 1017. The display controller 1013 is applied to control the display 1027 and the display processor 1015 is applied to process the original visual data. Also, in one embodiment the display driver IC 1003 comprises a display buffer 1021, a driver IC controller 1023 and a multiplexer 1025 besides the de-compressor 1019. The display buffer 1021 is applied to buffer de-compressed visual data such that the visual data can form a whole image. The multiplexer 1025 is applied to select a source of the de-compressed visual data. Besides, the driver IC controller 1023 is applied to control the operation of the display driver IC 1003. Also, in one embodiment, the above-mentioned classifying operation illustrated in FIG. 4-FIG. 7 is performed by the display processor 1015. However, the above-mentioned classifying operation illustrated in FIG. 4-FIG. 7 can be performed by other kinds of control units (not illustrated here). Please note, such control unit can be applied to control the operation of the compressor 1017.

FIG. 11 illustrates a visual data processing system according to another embodiment of the present application. Please note in the embodiment of FIG. 11, the solid lines indicate the path of visual data and the dotted lines indicate the paths of other signals such as control signals. In the embodiment of FIG. 11, the visual data processing system 1100 also comprises the display processing module 1101, the display driver IC 1103, the eye tracking device 1105 and the display interface 1107. However, in the embodiment of FIG. 11, the visual data sources are different from which in the embodiment of FIG. 10. More specifically, the display processing module 1101 in FIG. 11 receives visual data from the image decoder 1111, the video decoder 1115, or the graphic engine 1109. In one embodiment, the image decoder 1111 and the video decoder 1115 respectively receive visual data from the image encoder 1113 and the video encoder 1117. However, it will be appreciated that the image decoder 1111 and the video decoder 1115 can receive visual data from other external sources. Further, in one embodiment, the visual data is sensed by a sensor 1119, processed by an image signal processor 1121, and then transmitted to the image encoder 1113 or the video encoder 1117.

Figure 12:
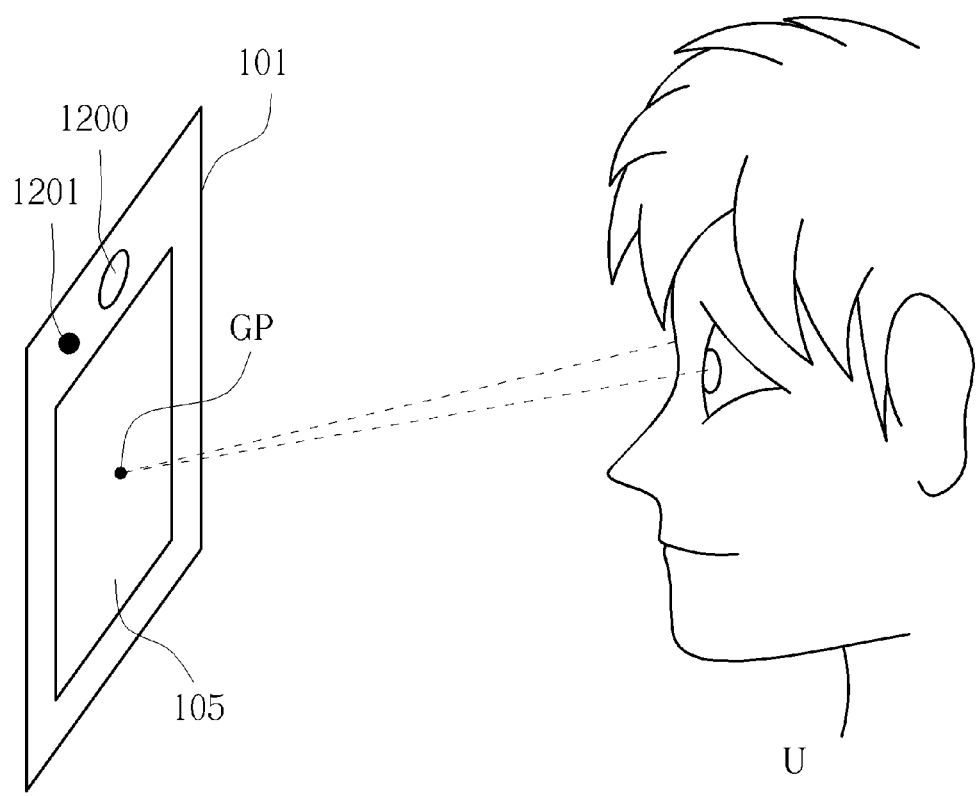
FIG. 12-15 are schematic diagrams illustrating visual processing systems according to other embodiments of the present application.

In the embodiment of FIG. 1, a portable electronic device 101 is taken for example to explain the concept of the present application. However, the visual data processing method and the visual data processing system provided by the present application are not limited to be applied to the portable electronic device illustrated in FIG. 1. For example, in the embodiment of FIG. 12, the camera 103 in the embodiment of FIG. 1 is replaced by an IR camera 1200. Further, in one embodiment, the IR camera 1200 further comprises an IR LED 1201, which is provided to assist detecting the gazing point position GP.

Figure 13:
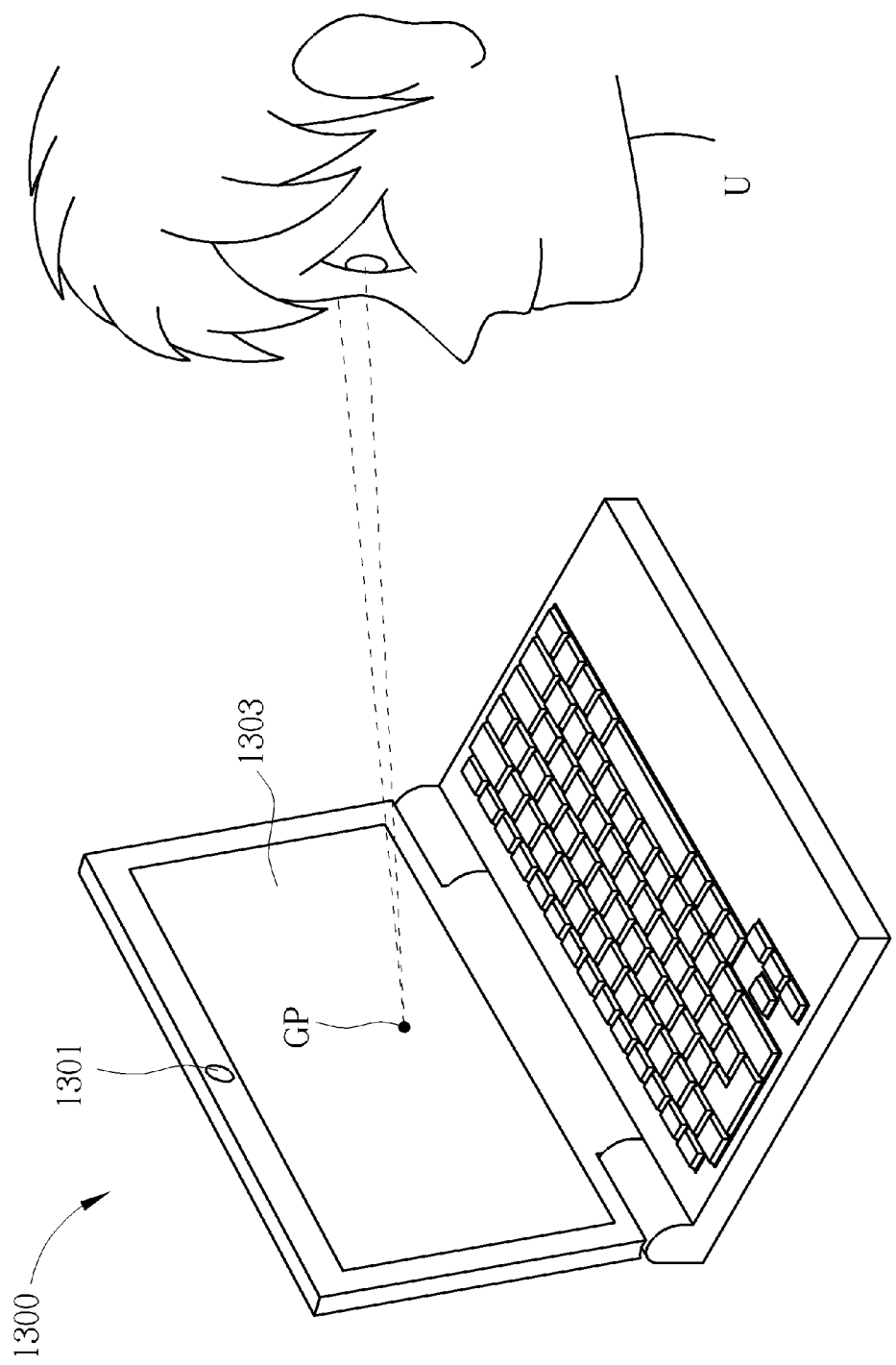

Further, the visual data processing method and the visual data processing system provided by the present application can be applied to devices besides a portable electronic device, such as the laptop 1300 illustrated in FIG. 13. For more detail, the laptop 1300 also comprises a camera 1301 (or an IR camera) and a display 1303, thus can perform the same function as illustrated in the embodiment of FIG. 1. Similar with the embodiment illustrated in FIG. 12, an IR LED can be provided on the laptop 1300 but not illustrated here.

Figure 14:
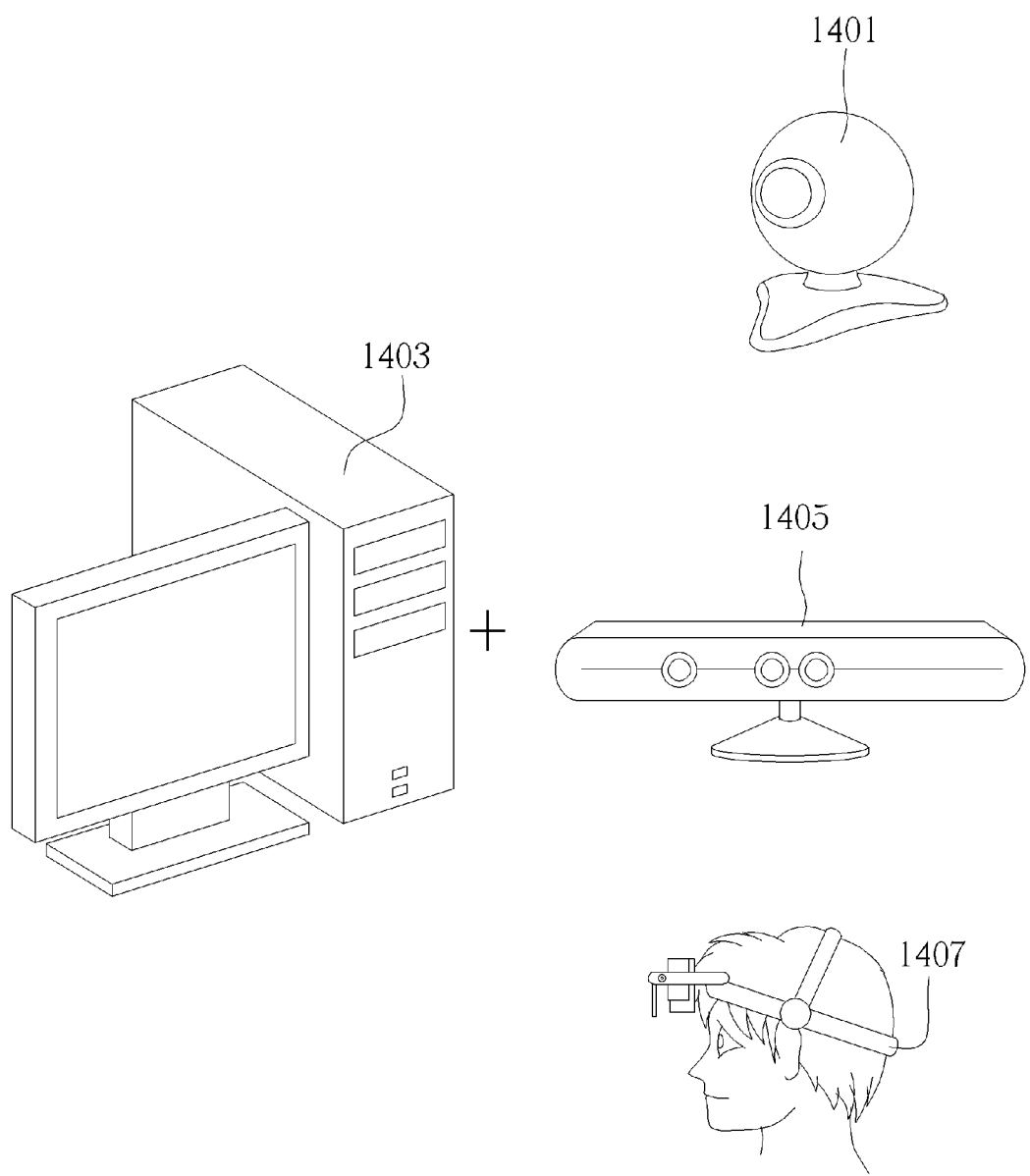

Further, the eye tracking device is not limited to be provided in an electronic device in which the display is provided. For example, in the embodiment of FIG. 14, a camera 1401 is connected to a desktop computer 1403. Further, the eye tracking device is not limited to a camera. In one embodiment, a motion sensing device 1405 or a wearable device 1407 can be applied as the eye tracking device.

Figure 15:
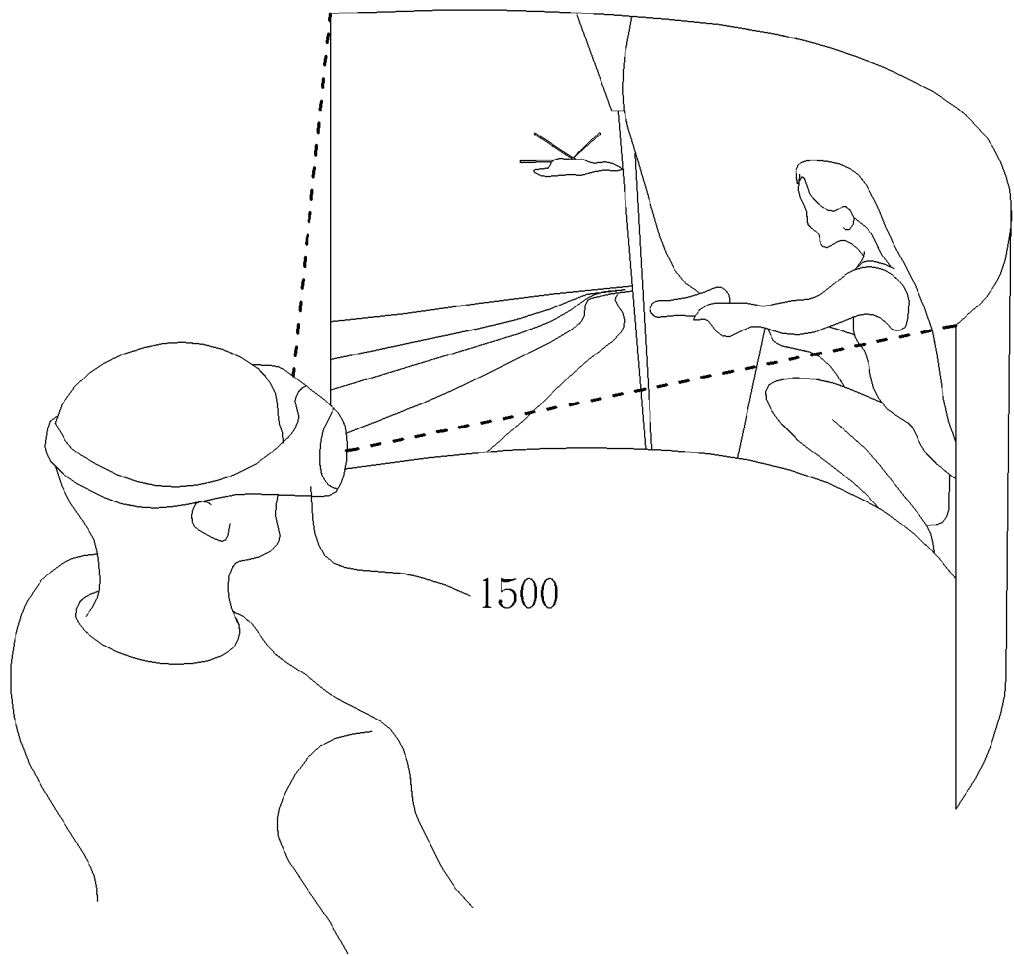

Besides, the visual data processing system provided by the present application is not limited to be provided to an electronic device which has a display needed to be put on a desk or hold by a hand. In the embodiment of FIG. 15, the visual data processing system provided by the present application is applied to a virtual reality device 1500, which is a wearable device.

In view of above-mentioned embodiments, the visual data can be processed according to the gazing point position of a user, thus the user can have better experience while watching the visual data. Also, the visual data processing method and the visual data processing system provided by the present application can be applied to various kinds of electronic devices, which can cause more convenience for the user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A visual data processing method comprising:
displaying visual data on a display, wherein the visual data is divided into a plurality of areas including a first area, a second area, and a third area that are disposed sequentially adjacent to one another in a first direction, wherein each one of the plurality of areas includes a length that spans an entirety of the display in a second direction that is perpendicular to the first direction;
detecting a gazing point position of a user on the display;
determining that the first area is located within a first distance range closer to the gazing point position, the second area is located within a second distance range farther from the gazing point position, and the third area is located within a third distance range farthest from the gazing point position, wherein the second area is located between the first area and the third area; and
applying, via a processing device, a first algorithm to the first area, a second algorithm to the second area, and a third algorithm to the third area, wherein a level of compression of each one of the first, second, and third algorithms is directly proportional to a distance of each one of the first, second, and third areas from the gazing point position, such that a first compression level of the first algorithm is less than a second compression level of the second algorithm, and the second compression level of the second algorithm is less than a third compression level of the third algorithm,
wherein the level of compression varies in the first direction and does not vary in the second direction that is perpendicular to the first direction.

2. The visual data processing method of claim 1, further comprising applying at least one of a sharpening operation, a brightness adjusting operation, a color adjusting operation, and a blur level adjusting operation to at least one of the plurality of areas.

3. The visual data processing method of claim 1, wherein the visual data is compressed by the respective ones of the first, second, and third algorithms and then de-compressed for display.

4. The visual data processing method of claim 1, wherein the plurality of areas are arranged by columns, or by rows, or by pixel area with a predetermined shape.

5. The visual data processing method of claim 1, wherein the visual data comprises image data or video data.

6. A visual data processing system, comprising:
a display configured to display visual data, wherein the visual data is divided into a plurality of areas including a first area, a second area, and a third area that are disposed sequentially adjacent to one another in a first direction, wherein each one of the plurality of areas includes a length that spans an entirety of the display in a second direction that is perpendicular to the first direction;
an eye tracking device configured to detect a gazing point position of a user on the display;
a processing device configured to:
determine that the first area is located within a first distance range closer to the gazing point position, the second area is located within a second distance range farther from the gazing point position, and the third area is located within a third distance range farthest from the gazing point position, wherein the second area is located between the first area and the third area; and
apply a first algorithm to the first area, a second algorithm to the second area, and a third algorithm to the third area, wherein a level of compression of each one of the first, second, and third algorithms is directly proportional to a distance of each one of the first, second, and third areas from the gazing point position, such that a first compression level of the first algorithm is less than a second compression level of the second algorithm, and the second compression level of the second algorithm is less than a third compression level of the third algorithm,
wherein the level of compression varies in the first direction and does not vary in the second direction that is perpendicular to the first direction.

7. The visual data processing system of claim 6, wherein the processing device is further configured to apply at least one of a sharpening operation, a brightness adjusting operation, a color adjusting operation, and a blur level adjusting operation to at least one of the plurality of areas.

8. The visual data processing system of claim 6, wherein the visual data is compressed by the respective ones of the first, second, and third algorithms and then de-compressed for display.

9. The visual data processing system of claim 6, wherein the plurality of areas are arranged by columns, or by rows, or a pixel area with a predetermined shape.

10. The visual data processing system of claim 6, wherein the visual data comprises image data or video data.

11. The visual data processing system of claim 6, wherein the visual data processing system is provided in a portable electronic device or in a laptop.

12. The visual data processing system of claim 6, wherein the display and the visual data processing system are provided in different electronic devices.

13. The visual data processing system of claim 6, wherein the visual data processing system is provided in a wearable electronic device.

14. A non-transitory computer-readable medium storing instructions that, when executed by one or more processors of a computing device, cause the computing device to:
display visual data on a display, wherein the visual data is divided into a plurality of areas including a first area, a second area, and a third area that are disposed sequentially adjacent to one another in a first direction, wherein each one of the plurality of areas includes a length that spans an entirety of the display in a second direction that is perpendicular to the first direction;
detect a gazing point position of a user on the display;
determine that the first area is located within a first distance range closer to the gazing point position, the second area is located within a second distance range farther from the gazing point position, and the third area is located within a third distance range farthest from the gazing point position, wherein the second area is located between the first area and the third area; and
apply, via a processing device, a first algorithm to the first area, a second algorithm to the second area, and a third algorithm to the third area, wherein a level of compression of each one of the first, second, and third algorithms is directly proportional to a distance of each one of the first, second, and third areas from the gazing point position, such that a first compression level of the first algorithm is less than a second compression level of the second algorithm, and the second compression level of the second algorithm is less than a third compression level of the third algorithm,
wherein the level of compression varies in the first direction and does not vary in the second direction that is perpendicular to the first direction.

* * * * *